(12) United States Patent
Dlugos et al.

(10) Patent No.: US 6,956,844 B2
(45) Date of Patent: Oct. 18, 2005

(54) FACSIMILE MACHINE HAVING MULTI-PURPOSE DATA PORTS FOR SIGNAL ROUTING AND DATA MANAGEMENT

(75) Inventors: Daniel F. Dlugos, Huntington, CT (US); Flavio M. Manduley, Woodbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 877 days.

(21) Appl. No.: 09/851,074

(22) Filed: May 8, 2001

(65) Prior Publication Data

US 2001/0028643 A1    Oct. 11, 2001

Related U.S. Application Data

(63) Continuation-in-part of application No. 09/470,585, filed on Dec. 22, 1999, now Pat. No. 6,584,113, and a continuation-in-part of application No. 09/470,730, filed on Dec. 22, 1999, now Pat. No. 6,463,133.

(51) Int. Cl.$^7$ .............................. H04J 3/17; H04J 3/22; H04M 11/00
(52) U.S. Cl. ...................... 370/352; 370/433; 370/465; 379/93.11
(58) Field of Search ................................ 370/474, 475, 370/328–352, 431–466; 379/39, 40, 100, 379/102, 90–93, 106–201; 455/219, 220, 455/455, 456, 406–452; 709/220–223

(56) References Cited

U.S. PATENT DOCUMENTS

| 4,106,092 A | 8/1978 | Millers, II |
| 4,275,385 A | 6/1981 | White |
| 4,812,992 A | 3/1989 | Storace et al. |
| 4,831,554 A | 5/1989 | Storace et al. |
| 4,926,325 A | 5/1990 | Benton et al. |
| 5,025,383 A | 6/1991 | Haines et al. |
| 5,062,133 A * | 10/1991 | Melrose .................... 379/93.11 |
| 5,070,523 A * | 12/1991 | Hafer et al. ............. 379/93.14 |
| 5,305,384 A | 4/1994 | Ashby et al. |
| 5,315,640 A * | 5/1994 | Takayama et al. ....... 379/93.08 |
| 5,425,051 A | 6/1995 | Mahany |
| 5,673,308 A | 9/1997 | Akhavan |
| 5,687,194 A | 11/1997 | Paneth et al. |
| 5,925,101 A | 7/1999 | Bayless et al. |
| 6,038,678 A | 3/2000 | Fukushima et al. |

(Continued)

OTHER PUBLICATIONS

Specification of U.S. Appl. No. 09/470,585, titled "Data Transfer Module and System Using Same," filed Dec. 22, 1999.

(Continued)

*Primary Examiner*—Man U. Phan
(74) *Attorney, Agent, or Firm*—Brian A. Lemm; Angelo N. Chaclas

(57) ABSTRACT

A facsimile machine that is capable of receiving, transmitting and storing both document images and data transfers, identifying the appropriate device the data transfer is intended for, and providing the data transfer to the appropriate device is disclosed. A facsimile machine is provided with one or more ports for coupling with other office equipment, such as, for example, postage meters, postage scales, personal computers, etc. Data transfers from a service center or the like are received by the facsimile machine and identified as to which device is the intended recipient. The facsimile machine can then send the data transfer to the intended device, or store the data transfer for sending to the intended device at a later time. Accordingly, only a single analog telephone line is required for all of the devices coupled to the facsimile machine.

37 Claims, 3 Drawing Sheets

U.S. PATENT DOCUMENTS

| | | | |
|---|---|---|---|
| 6,161,134 A | 12/2000 | Wang et al. | |
| 6,202,124 B1 * | 3/2001 | Kern et al. | 711/112 |
| 6,208,864 B1 | 3/2001 | Agrawal et al. | |
| 6,463,133 B1 * | 10/2002 | Dlugos et al. | 379/93.11 |
| 6,584,113 B1 * | 6/2003 | Manduley et al. | 370/433 |
| 6,608,889 B2 * | 8/2003 | Berthoud et al. | 379/93.08 |
| 6,658,254 B1 * | 12/2003 | Purdy et al. | 455/445 |
| 6,765,993 B2 * | 7/2004 | Cueman | 379/40 |
| 2002/0099562 A1 * | 7/2002 | Bruce et al. | 705/1 |
| 2002/0126696 A1 * | 9/2002 | Toguchi et al. | 370/465 |
| 2002/0146980 A1 * | 10/2002 | Solondz et al. | 455/21 |
| 2004/0023656 A1 * | 2/2004 | Purdy et al. | 455/445 |

OTHER PUBLICATIONS

Specification of U.S. Appl. No. 09/470,730, title "Apparatus for Telecommunications Signal Routing and Data Management," filed Dec. 22, 1999.

* cited by examiner

FACSIMILE MACHINE HAVING MULTI-PURPOSE DATA PORTS FOR SIGNAL ROUTING AND DATA MANAGEMENT

CROSS-REFERENCE TO RELATED APPLICATIONS

This application is a continuation-in-part application of application Ser. Nos. 09/470,585, filed Dec. 22, 1999, now U.S. Pat. No. 6,584,113, and 09/470,730, filed Dec. 22, 1999, now U.S. Pat. No. 6,463,133, the entirety of which are hereby incorporated by reference.

FIELD OF THE INVENTION

The invention disclosed herein relates generally to communication systems, and more particularly to a facsimile machine having multi-purpose data ports for routing and transfer of data.

BACKGROUND OF THE INVENTION

In many businesses, a wide variety of devices are utilized that need to conduct communications over a standard telephone line from time to time. Technological advances have enabled facsimile machines to become standard equipment in every office environment, from large corporations to the smallest businesses. Facsimile machines operate by encoding an image on a paper into a series of tones that are then transmitted over the telephone network to a receiving facsimile machine. The receiving facsimile machine decodes the transmitted message and reconstructs the image. Standard facsimile protocols for effectuating communications between facsimile machines have been defined, and most facsimile machines operate using one or more such protocols. The typical connection method for most facsimile machines is via a telephone line of a Public Switched Telephone Network (PSTN). It is therefore necessary to provision a telephone line for use by each facsimile machine.

Typical office environments also include additional devices utilized for efficient operation of the office which also need to conduct communications over a standard telephone line from time to time. For example, many office environments include one or more postage meters, postage scales, and mailing equipment for the processing of mail, as well as several personal computers.

In many commercial applications, it is necessary to be able to remotely diagnose, update, refill and retrieve information from such devices. For instance, postage scales may require postage rate updates from time to time so that the correct postage for a particular mail piece can be determined based upon the weight of that mail piece. A postage scale may also need servicing from time to time and the ability to remotely diagnose the condition of the scale is useful for such purpose. Similarly, a postage meter needs to have funds refilled periodically, and may also need servicing from time to time, thereby requiring remote access. One way to achieve the remote access for such devices is to have the devices continuously connected to a telephone line to receive updated rate data or funds from a service center and to provide diagnostic data to the service center. However, such continuous connections may be cost prohibitive for the user, as each device requires its own dedicated telephone line. Providing a dedicated telephone line for each device will significantly increase costs, as it is then necessary for the user to obtain and pay for multiple telephone lines, one for each piece of equipment.

Another way to achieve remote access for several devices without providing multiple telephone lines is to provide some type of switching mechanism to switch between the several devices coupled to a single telephone. Utilizing a switching mechanism can be cumbersome and awkward, especially if it is necessary to switch between devices several times during the course of a day. Additionally, if a data transfer is to be received and the switch is not set to the right device, the data transfer will be unable to be completed.

Thus, there exists a need for a device that can receive, transmit and store data transfers intended for one of several devices, such as, for example, software upgrades, funds transfer, diagnostic information, and the like, and provide the received data to the appropriate device, thereby eliminating the need for multiple telephone lines or a switching mechanism to switch between the multiple devices.

SUMMARY OF THE INVENTION

The present invention alleviates the problems associated with the prior art and provides a facsimile machine that is capable of receiving, transmitting and storing both document images and data transfers, identifying the appropriate device the data transfer is intended for, and providing the data transfer to or from the appropriate device.

In accordance with the present invention, a facsimile machine is provided with one or more ports for coupling with other office equipment, such as, for example, postage meters, postage scales, personal computers, etc. Data transfers from a service center or the like are received by the facsimile machine and identified as to which device is the intended recipient. The facsimile machine can then send the data transfer or retrieve to the intended device, or store the data transfer for sending to the intended device at a later time. Additionally, the facsimile machine can retrieve data transfers from the coupled devices for transfer to a service center. Accordingly, only a single analog telephone line is required for all of the devices coupled to the facsimile machine.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
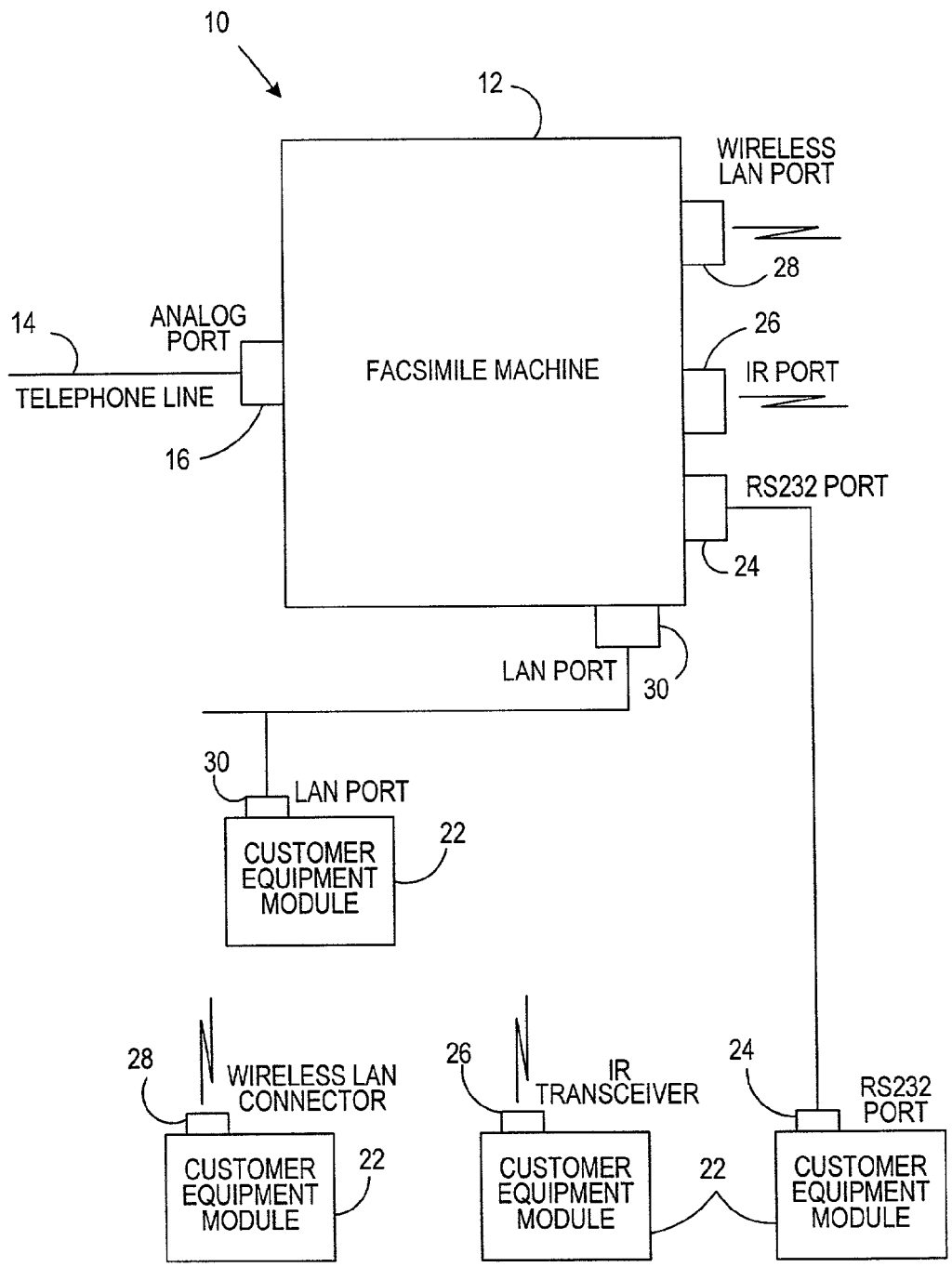
FIG. 1 is a block diagram of a system according to the present invention.

In describing the present invention, reference is made to the drawings, wherein there is seen in FIG. 1 a system 10 according to the present invention. The system 10 provides for communication with one or more types of customer equipment and a third party, such as, for example, a service center, by directing incoming data transfers from the third party equipment to the appropriate customer equipment connected thereto and by retrieving data transfers from the customer equipment for sending to the third party equipment as will be described below.

Figure 2:
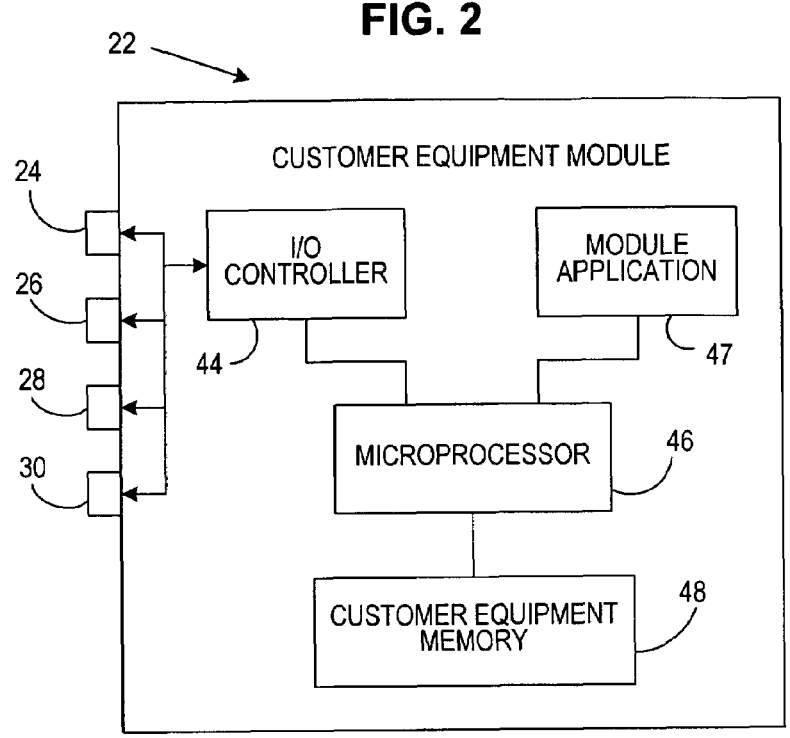
FIG. 2 is a block diagram of a portion of a typical customer equipment module used in the system 10 of FIG. 1.

System 10 includes a facsimile machine 12 coupled to a telephone line 14 via analog port 16 for receiving or transmitting an incoming or outgoing telecommunications signal. One or more types of customer equipment modules 22, such as, for example, a postage scale, a postage meter, a mailing machine, a personal computer, etc., are coupled to the facsimile machine 12. The customer equipment modules 22 can be coupled to the facsimile machine 12 via an RS232 serial connection port 24, an infrared transceiver port 26, a wireless local area network (LAN) port 28, or a wired local area network (LAN) port 30. It should be understood that other types of hardwired or wireless ports can also be used for communicating between the facsimile machine 12 and the various types of customer modules 22, provided that the modules 22 have corresponding ports or connectors and associated hardware for communicating with the facsimile machine 12. As illustrated in FIG. 2, each customer equipment module 22 includes an I/O controller 44, a microprocessor 46, a module application 47, and equipment memory 48. The module 22 communicates via an RS232 port 24, an infrared transceiver port 26, a wireless LAN port 28 or a wired LAN port 30. Although four ports are shown in FIG. 2, typically a customer equipment module 22 would have only one or two types of ports for communicating with facsimile machine 12.

As noted above each customer equipment module 22 represents one of a number of different products for use at the customer location including, for example, postal scales, postal meters, mailing machines, inserters, personal computers, etc. Each type of customer equipment module 22 performs a corresponding function as controlled by the microprocessor 46 and module application 47. As noted above, such devices traditionally require periodic updating with respect to rate information, application software updates and the like, as well as conveyance of certain operating conditions for determining the extent of use with respect to the particular module via a telephone line. For instance, if the customer equipment module 22 is a postal scale, it is necessary from time to time to update the software modules executable by the microprocessor 46 and which are stored in the customer equipment memory 48. In addition, it may be necessary from time to time to perform diagnostics on the postal scale in which case data can be collected from the scale and transferred to a third party equipment module or service center via a telephone line.

If the customer equipment module 22 is a postal meter, it is typically necessary to periodically refill the funds for use by the postal meter. Therefore, to eliminate the need for each of the several devices to have a dedicated telephone line or a switch to switch between the devices coupled to the same telephone line, a facsimile machine 12 according to the present invention is utilized to provide a means for communicating between a service center and such customer equipment modules 22 through the above-mentioned ports. Thus, the facsimile machine 12 provides an intermediary mechanism for conveying information between customer equipment modules 22 and third party equipment, such as, for example, a service center, utilizing only a single telephone line, for purposes of transferring data to such customer equipment modules 22, as well as for purposes of updating information at the third party equipment or at some further downstream location such as the U.S. Postal Service with regard to postage by phone or the like.

Figure 3:
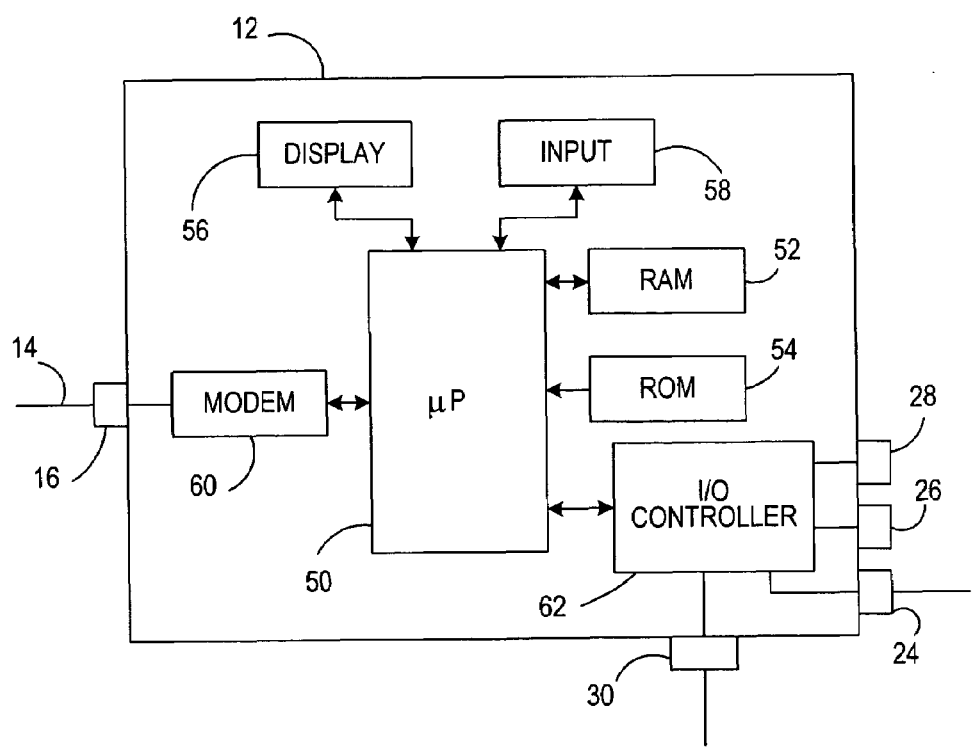
FIG. 3 is a block diagram of the facsimile machine illustrated in FIG. 1 according to the present invention.

FIG. 3 illustrates in block diagram form a facsimile machine 12 in accordance with the present invention. As shown, the facsimile machine 12 includes a microprocessor 50, random access memory (RAM) 52, read only memory (ROM) 54, a display 56 an input device 58, such as, for example, a keyboard, and a modem 60. Modem 60 is coupled to telephone line 14 via port 16. The modem 60 demodulates telecommunications signals received at the telephone line port 16 into data signals for transmission to microprocessor 50 and modulates data signals from microprocessor 50 into telecommunications signals for transmission at the telephone line port 16 via telephone line 14. In addition, according to the present invention, the facsimile machine 12 includes an input/output (I/O) controller 62 and an RS232 port 24, an infrared port 26, a wireless local area network (LAN) port 28 and a hardwire LAN port 30 as previously discussed. It should be understood that while FIG. 3 illustrates four ports, the invention is not so limited and any number of any type of port may be provided.

Microprocessor 50 is responsible for communicating with the display 56, keyboard 58, modem 60, and memory modules 52 and 54, for performing the operations of a conventional facsimile machine. According to the present invention, microprocessor 50 also is responsible for communicating with the external ports 24, 26, 28 and 30 via I/O controller 62 for communicating between the customer equipment modules 22 and a third party equipment module, such as, for example, a service center, via telephone line 14.

Figure 4:
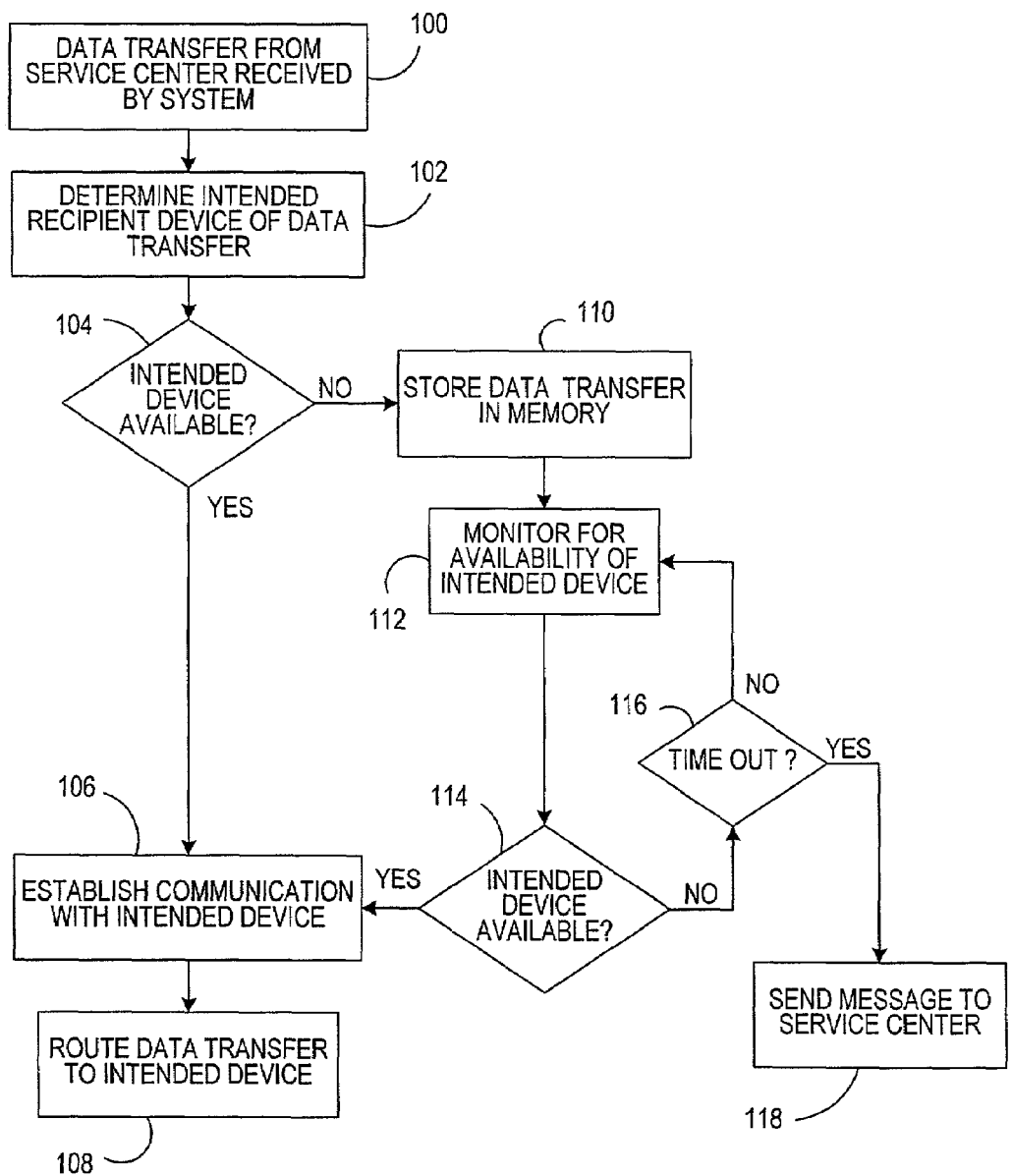
FIG. 4 illustrates in flow diagram form the receipt and routing of data transfers according to the present invention.

The operation of the system 10 according to the present invention will now be described with reference to FIG. 4. Suppose, for example, a software update is to be provided from a service center to a customer equipment module 22. For example, if the customer equipment module 22 is a scale, a postage rate update may be necessary to ensure the proper amount of postage is being determined by the scale. A service center will place a call via telephone line 14 to facsimile machine 12 and transfer the data, i.e., the software update including the new postage rates, to the facsimile machine 12 in step 100. Once the data has been downloaded to facsimile machine 12, the connection between the service center and the facsimile machine 12 can be terminated, thereby freeing telephone line 12 for other operations. In step 102, microprocessor 50 determines the intended recipient of the data transfer based on a header included with the data transfer. For example, the data header can identify the specific device, based on an address or identification number, for which the data is intended, or alternatively, the data header can specify the type of data attached and microprocessor 50 can identify the intended device based on that information.

Once the intended recipient of the data transfer is identified, in step 104 microprocessor 50 determines if the intended device is available. When the system 10 is powered up, each customer equipment module 22 included in the system 10 will register with the facsimile machine 12 to provide its address or identification number. Microprocessor 50, via I/O controller 62, will continuously monitor each customer equipment module 22 that has previously registered and also monitor any other available ports to determine if any additional customer equipment modules have been subsequently added. Microprocessor 50 also monitors the status of each module 22 that has registered, whether such registration has occurred upon initialization of the system 10 or subsequently thereto. In step 104, microprocessor 50 will determine if the intended device of the data transfer is available, i.e., whether the intended device has registered with the system 10 or not, and if the intended device has registered, if it is currently available to receive the data transfer. Although a module 22 may have registered with the system 10, there may be times when the module 22 is currently in use and therefore not able to receive any data transfers. Additionally, the service center and customer equipment modules 22 can also be programmed to specify dates/times when data transfers can be downloaded or transmitted via facsimile machine 12. In the case of date/time being specified, microprocessor 50 will also check the date and/or time to determine if the intended device will accept the data transfer.

If it is determined in step 104 that the intended device is available and will accept the data transfer, then in step 106 a communication is established with the intended device via I/O controller 62 and the appropriate port 24–30 and in step 108 the data transfer is routed directly to the intended customer equipment module 22. If in step 104 it is determined that the intended device is not available, i.e., either the module 22 for which the data transfer is intended for is not currently registered with the system 10; the module 22 for which the data transfer is intended for is currently busy and cannot accept any data transfers; or the date and/or time criteria specified by the module 22 for which the data transfer is intended are not satisfied, then in step 110 the data transfer is stored in the RAM 52. In step 112, the microprocessor 50 monitors for availability of the intended device, and in step 114 determines if the intended device is now available and will accept the data transfer. If the intended device is not available, in step 116 it is determined if a predetermined time period for monitoring has elapsed or not. If the predetermined time period has not elapsed, then the monitoring continues in step 112. If it is determined in step 116 that the predetermined time period has expired, then in step 118 a message will be sent from facsimile machine 50 to the service center indicating the data transfer has not been completed and a retry may be necessary.

If it is determined in step 114 that the intended device is now available and will accept the data transfer, then in step 106 a communication is established with the intended device via I/O controller 62 and the appropriate port 24–30 and in step 108 the data transfer is routed to the intended customer equipment module 22. For example, if the module 22 for which the data transfer is intended is not turned on when the data transfer is received by facsimile machine 12, the microprocessor 50 will continue to monitor the system until the intended module 22 is turned on and registers with the facsimile machine 12. If the intended module 22 is registered with the system but not able to receive a data transfer due to current operation, the microprocessor 50 will continue to monitor the system until the intended module 22 is finished with its operation and available to receive the data transfer.

Thus, according to the present invention, data transfers from a service center or the like are received by the facsimile machine 12 and identified as to which device is the intended recipient. The facsimile machine 12 can then send the data transfer to the intended device, or store the data transfer for sending to the intended device at a later time. It should be noted that memory 52 is capable of storing several data transfers from the service center for routing at different times. Accordingly, a service center can send data transfers intended for any of the devices provided as part of system 10 at any time without the need for the intended devices to be currently available to receive the data transfers. Thus, automatic transfers can occur daily without the need for the module 22 to be directly connected to the phone line 14. For example, a postage meter can receive daily refills of a small amount of postage without having a dedicated telephone line for the meter, thereby decreasing the risk of losing significant sums of money should the meter be stolen.

According to the present invention, data transfers can also be initiated by a customer equipment module 22. For example, if the customer equipment module 22 is a scale, it may not have all rates for every possible shipping carrier or destination stored in its Programmable Read Only Memory (PROM). If a rate service which is not stored in the PROM is required, the scale can initiate a data transfer of the appropriate rating engine to a service center via the facsimile machine 12. Accordingly, the size of the PROM in the scale can be reduced, as the present invention allows for easy access for downloading additional rate services, thereby reducing the cost of the scale. Additionally, it will not be necessary to store many different rating engines in the scale, as the customer can now easily contact the service center and have the desired rating engines downloaded. If the customer equipment module 22 is a postage meter, the meter can request refills upon reaching a threshold amount of postage still remaining in the meter, or alternatively, can automatically request a refill at a certain time each day. The meter will initiate a transfer of funds from a service center via the facsimile machine 12.

It should be noted that data transfers can also occur from the customer equipment modules 22 to the service center via facsimile machine 12. For example, a service center can place a call periodically to facsimile machine 12 and request diagnostic information, such as, for example, current operating conditions, amount of usage, amount of funds remaining, etc., from one or more of the customer equipment modules 22. Such requests can be linked to a real time clock, such that at certain times of the day and/or on certain dates a request is automatically initiated. Once the request is received by facsimile machine 12, it can be processed similarly to a data transfer as described above with respect to FIG. 4, i.e., it can be sent directly to the appropriate customer equipment module 22 or stored in memory 52 for transfer at a later time. Upon receipt of the request for the diagnostic information, the customer equipment modules can process the request and provide the desired information back to the facsimile machine 12 via its corresponding port 24–30. The diagnostic information can be stored by facsimile machine 12 in RAM 52 and sent back to the service center via telephone line 14 at an appropriate time. Accordingly, it is not necessary for the service center to maintain the connection via telephone line 14 while waiting for the diagnostic information to be prepared by the customer equipment module 22, thereby freeing the telephone line 14 for other operations.

In another example, the facsimile machine 12 can act as an agent for the customer equipment modules 22 to send data, messages or requests to the service center. For example, a request for a funds transfer with the appropriate data can be sent to the service center at the request of a postage meter, or the detection of an impending failure mode at one of the customer equipment modules 22 can be sent to the service center via the facsimile machine 12 at the request of the failing customer equipment module 22.

If the customer equipment modules 22 include a personal computer, system 10 can also be used to download images and the like for display on the personal computer. For example, images of forms for value added services, such as return receipt, insurance, etc., can be transferred from a service center to facsimile machine 12 utilizing the imaging capabilities of the facsimile machine 12. Facsimile machine 12 can then transfer the forms to a personal computer for display, completion and printing for use.

It should be understood that prior to the transfer of data either from the service center to facsimile machine 12 or from facsimile machine 12 to the service center, the data can be encrypted before sending and decrypted upon receipt to ensure that the transfer was secure and the data has not been tampered with. Any well known data encryption and decryption techniques may be used, such as those which use public and private key management.

Additionally, it should also be noted that the above described transfers of data can also be linked to the time and date. Thus, for example, a data transfer can be provided with a field indicating the time or date on which the transfer is to occur. Upon reaching that time and/or date, the data transfer will automatically be initiated. Further, as noted above, the service center and customer equipment modules 22 can also specify dates/times when data transfers can be accepted from facsimile machine 12.

Thus, according to the present invention, a facsimile machine is provided with one or more ports for coupling with other office equipment, such as, for example, postage meters, postage scales, personal computers, etc. Data transfers from a service center or the like are received by the facsimile machine and identified as to which device is the intended recipient. The facsimile machine can then send the data transfer to the intended device, or store the data transfer for sending to the intended device at a later time. Additionally, the facsimile machine can retrieve data transfers from the coupled devices for transfer to a service center. Accordingly, only a single analog telephone line is required for all of the devices coupled to the facsimile machine.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A facsimile machine comprising:
an input port for coupling to a telephone line;
a controller coupled to said input port;
a memory device coupled to said controller;
a plurality of module ports, each of said plurality of module ports for coupling to one of a plurality of equipment modules such that more than one equipment module can be simultaneously coupled to said facsimile machine; and
an input/output controller coupled between said controller and said plurality of module ports,
wherein said facsimile machine receives a data transfer, via said telephone line, from a service center, said data transfer intended for one of said plurality of equipment modules coupled to said facsimile machine, said controller determines said one of said plurality of equipment modules said data transfer is intended for based on information included in said data transfer and determines if said one of said plurality of equipment modules is available to receive said data transfer, and if said one of said plurality of equipment modules is available to receive said data transfer, said controller causes said input/output controller to route said data transfer to said one of said plurality of equipment modules.

2. The facsimile machine according to claim 1, wherein if said one of said plurality of equipment modules is not available to receive said data transfer, said controller stores said data transfer in said memory.

3. The facsimile machine according to claim 1, wherein said controller determines if said one of said plurality of equipment modules is available based on time of day.

4. The facsimile machine according to claim 1, wherein said controller determines if said one of said plurality of equipment modules is available based on the date.

5. The facsimile machine according to claim 1, wherein said facsimile machine receives data from said plurality of equipment modules and said controller sends said data to said service center via said telephone line.

6. The facsimile machine according to claim 1, wherein said plurality of module ports includes a serial data port.

7. The facsimile machine according to claim 1, wherein said plurality of module ports includes an infrared transceiver port.

8. The facsimile machine according to claim 1, wherein said plurality of module ports includes a LAN port.

9. The facsimile machine according to claim 8, wherein said LAN port is wireless.

10. A system for routing a data transfer comprising:
a plurality of customer equipment modules; and
a facsimile machine coupled to each of said plurality of customer equipment modules, said facsimile machine comprising:
an input port for coupling to a telephone line;
a controller coupled to said input port;
a memory device coupled to said controller;
a plurality of module ports, each of said plurality of module ports for coupling said facsimile machine to a respective one of said plurality of customer equipment modules such that more than one customer equipment module can be simultaneously coupled to said facsimile machine; and
an input/output controller coupled between said controller and said plurality of module ports,
wherein said facsimile machine receives said data transfer from a service center via said telephone line, said data transfer being intended for one of said plurality of customer equipment modules, coupled to said facsimile machine, said controller determines said one of said plurality of customer equipment modules said data transfer is intended for based on information included in the data transfer and determines if said one of said plurality of equipment modules is available to receive said data transfer, and if said one of said plurality of equipment modules is available to receive said data transfer, said controller causes said input/output controller to route said data transfer to said one of said plurality of customer equipment modules.

11. The system according to claim 10, wherein if said one of said plurality of equipment modules is not available to receive said data transfer, said controller stores said data transfer in said memory.

12. The system according to claim 10, wherein said controller determines if said one of said plurality of equipment modules is available based on time of day.

13. The system according to claim 10, wherein said controller determines if said one of said plurality of equipment modules is available based the date.

14. The system according to claim 10, wherein said facsimile machine receives data from said plurality of equipment modules and said controller sends said data to said service center via said telephone line.

15. The system according to claim 14, wherein said data received from said plurality of equipment modules includes diagnostic information.

16. The system according to claim 10, wherein said plurality of module ports includes a serial data port.

17. The system according to claim 10, wherein said plurality of module ports includes an infrared transceiver port.

18. The system according to claim 10, wherein said plurality of module ports includes a LAN port.

19. The system according to claim 18, wherein said LAN port is wireless.

20. The system according to claim 10, wherein said plurality of customer equipment modules includes a postage scale.

21. The system according to claim 20, wherein said data transfer includes a rate update.

22. The system according to claim 10, wherein said plurality of customer equipment modules includes a postage meter.

23. The system according to claim 22, wherein said data transfer includes funds for said postage meter.

24. The system according to claim 10, wherein said plurality of customer equipment modules includes a mailing machine.

25. The system according to claim 10, wherein said plurality of customer equipment modules includes a personal computer.

26. A method for routing a data transfer comprising the steps of:
receiving said data transfer at a facsimile machine, said facsimile machine having a plurality of customer equipment modules simultaneously coupled thereto, said data transfer being intended for one of said plurality of customer equipment modules;
determining said one of said plurality of customer equipment modules for which said data transfer is intended based on information included in said data transfer;
determining if said one of said plurality of customer equipment modules is available to receive said data transfer; and
if said one of said plurality of customer equipment modules is available to receive said data transfer, routing said data transfer to said one of said plurality of customer equipment modules.

27. The method according to claim 26, wherein if said one of said plurality of customer equipment modules is not available to receive said data transfer, said method further comprises:
storing said data transfer in a memory.

28. The method according to claim 26, wherein said step of determining said one of said plurality of customer equipment modules further comprises:
reading a header associated with said data transfer, said header specifying said one of said plurality of customer equipment modules for which said data transfer is intended.

29. The method according to claim 26, wherein said step of determining if said one of said plurality of customer equipment modules is available to receive said data transfer further comprises:
monitoring operation status of said one of said plurality of customer equipment modules.

30. The method according to claim 26, wherein said step of determining if said one of said plurality of customer equipment modules is available to receive said data transfer further comprises:
determining a time of day; and
comparing said determined time of day to a predetermined time of day when said one of said plurality of customer equipment modules will accept a data transfer.

31. The method according to claim 26, wherein said step of determining if said one of said plurality of customer equipment modules is available to receive said data transfer further comprises:
determining the date; and
comparing said determined date to predetermined dates when said one of said plurality of customer equipment modules will accept a data transfer.

32. The method according to claim 26, wherein said data transfer is from a service center and received by said facsimile machine via a telephone line.

33. The method according to claim 32, wherein said service center sends said data transfer in response to a request from said one of said plurality of customer equipment modules.

34. The method according to claim 26, wherein said plurality of customer equipment modules includes a postage scale.

35. The method according to claim 26, wherein said plurality of customer equipment modules includes a postage meter.

36. The method according to claim 26, wherein said plurality of customer equipment modules includes a mailing machine.

37. The method according to claim 26, wherein said plurality of customer equipment modules includes a personal computer.

* * * * *